3,076,039
HALOMETHYLATION PROCESS
George W. Ayers, Chicago, and William C. Allinder, Arlington Heights, Ill., assignors to The Pure Oil Company, Chicago, Ill., a corporation of Ohio
No Drawing. Filed Nov. 25, 1959, Ser. No. 855,257
8 Claims. (Cl. 260—649)

This invention relates to a process of preparing halomethylated derivatives of organic compounds having one or more replaceable hydrogen atoms and products of such process. More particularly, this invention relates to a composition of matter and its method of preparation comprising the reaction product of organic compounds having one or more replaceable hydrogen atoms, for example, aromatic hydrocarbons and derivatives thereof, halogenated aromatics, nitrated aromatics, phenols, aryl esters, aryl ethers, thioethers, aryl aldehydes, and aryl ketones; heterocyclic compounds of aromatic character containing sulfur or nitrogen in the ring; and sources rich in complex polynuclear, high-molecular-weight aromatic and/or heterocyclic compounds, e.g., those derived from sources rich in complex polynuclear, high-molecular-weight, aromatic compounds, including reactable compounds present in solvent extracts obtained in the solvent refining of mineral lubricating oils and fractions thereof, with formaldehyde or paraformaldehyde and the like, and a phosphorus oxyhalide to produce halomethylated derivatives which are useful in lubricating oil compositions, or as organic intermediates. Halomethylation as applied to form iodo-, bromo-, and chloromethylated products is of value in organic synthesis because the —$CH_2Cl$ group, as an example, can be easily converted to other groups such as —$CH_2OH$, —$CHO$, $CH_2CN$, and —$CH_3$.

It is known in the art that simple aromatic compounds, such as benzene and naphthalene, can be chloromethylated with formaldehyde, formalin or paraformaldehyde and hydrogen chloride or hydrochloric acid plus zinc chloride, sulfuric acid, acetic acid, stannic chloride or phosphoric acid as the catalyst. In some of these reactions no catalyst is required. Chloromethyl ether, prepared by the reaction of paraformaldehyde, methanol and hydrogen chloride may be used in place of formaldehyde and hydrogen chloride.

The chloromethylation reaction involves the replacement of a hydrogen atom on a cyclic nucleus of aromatic character by a chloromethyl group in a single operation. Thus, using the classic example of Grassi and Maselli (Gazz. Chim. ital., 28, II, 477 (1898)), benzene, hydrogen chloride, paraformaldehyde and zinc chloride react as follows:

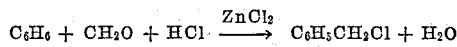

$$C_6H_6 + CH_2O + HCl \xrightarrow{ZnCl_2} C_6H_5CH_2Cl + H_2O$$

The present invention is predicated on the discovery that on conducting the reaction of complex aromatic compounds with paraformaldehyde and phosphorus oxychloride to prepare the carbinyl phosphate derivatives, such products were not obtained and, contrary to expectations, the aromatic compounds were chloromethylated. The reaction proceeds at ambient temperatures, i.e., 20° to 105° C., by treatment with paraformaldehyde or the equivalent, and phosphorus oxychloride. This is totally unexpected since a study of the prior art on the reaction of phosphorus oxychloride leads one to expect that a mixture of carbinyl phosphates will be formed. An investigation of this novel reaction showed that the use of hydrogen chloride in the reaction of the complex aromatic compounds with paraformaldehyde and phosphorus oxychloride did not increase the yield of the chloromethylated product.

The novel process of this invention is illustrated by the following generalized representation:

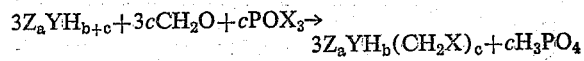

$$3Z_aYH_{b+c} + 3cCH_2O + cPOX_3 \rightarrow 3Z_aYH_b(CH_2X)_c + cH_3PO_4$$

wherein Y is a cyclic structure containing carbon atoms or carbon atoms plus up to three atoms of sulfur or nitrogen, such as the cyclic structures in mononuclear aromatics, dinuclear aromatics, trinuclear aromatics, tetranuclear aromatics, pentanuclear aromatics, heterocyclics with aromatic properties, condensed alicyclic-aromatics, condensed heterocyclic-aromatics or polyheterocyclics with aromatic properties; Z is an atom or organic radical, such as halogen, nitro, sulfo, alkyl, amino, aralkyl, carboxyl, amyl, biphenyl, bromine, butoxy butyl, sec-butyl, t-butyl, caproyl, capryl, carbamyl, carbethoxy, carbomethoxy, cetyl, chlorine, cresoxy, cresyl, cyano, cyclobutyl, cyclohexyl, cyclopentyl, cyclopropyl, decyl, dodecyl, ethoxy, ethyl, fluoro, formamido, formyl, heptyl, hydroxy, iodine, isobutoxy, isobutyl, mercapto, methoxy, methyl, morpholinyl, naphthoxy, naphthyl, octyl, phenethyl phenoxy, piperidyl, propoxy, propyl, toloxy, tolyl and xylyl; H is hydrogen; $a$ is an integer with a value of 0 to 5; $b$ is an integer with a value depending upon the specific cyclic structure, and is the number of hydrogen atoms attached to the cyclic structure that do not enter into the chloromethylation reaction; and $c$ is an integer with a value of at least 1. Examples of Y in the formula include the cyclic structures present in benzene, naphthalene, phenanthrene, anthracene, chrysene, hydrindene, perylene, pyrene, thiophene, pyrrole, pyrazole, pyridine, indene, benzothiophene, dibenzothiophene, indole, tetralin, quinoline, isoquinoline and acridine. X in the formula is chlorine, bromine or iodine. Y may be carbocyclic or heterocyclic.

It becomes, therefore, a primary object of this invention to provide a new product comprising halomethylated aromatic compounds derived from sources rich in complex, polynuclear, high-molecular-weight aromatic hydrocarbons.

Another object of this invention is to provide a new method of chloromethylating aromatic hydrocarbons having at least one replaceable nuclear hydrogen which comprises reaction of said aromatic hydrocarbons with phosphorus oxychloride in the presence of a formaldehyde-producing agent.

Another object of this invention is to provide a method of utilizing synthetic or naturally-occurring mixtures rich in complex, polynuclear, aromatic hydrocarbons.

Still a further object of this invention is to provide chloromethylated, complex, polynuclear, aromatic compounds of high molecular weight, as derived from solvent extracts obtained in the solvent refining of mineral lubricating oils.

Another object of the invention is to provide a new method of chloromethylating aromatic hydrocarbons having at least one replaceable hydrogen atom derived from solvent extracts by reaction with phosphorus oxychloride and a formaldehyde-producing agent.

These and other objects of this invention will be described or become apparent as the specification proceeds.

A feature of this invention is the discovery that, in general, compounds of aromatic nature can be chloromethylated using phosphorus oxychloride and a formaldehyde-producing agent. This reaction has further been found to apply to the complex, high-molecular-weight, polynuclear aromatic compounds present in solvent extracts from the refining of mineral lubricating oils. Because of the complex nature of these aromatic compounds, many of which are characterized by the presence of sulfur, and nitrogen atoms in the molecules, this discovery is considered to be particularly noteworthy.

The starting materials useful in the present reaction, coming within the general formula heretofore set forth, include benzene, phenanthrene, anthracene, chrysene, benzphenanthrene, pyrene, perylene, and derivatives thereof, obtained from petroleum sources, particularly solvent extracts; and chlorobenzene, p-di-chlorobenzene, butoxybenzene, the cresols, the xylenes, cyclobutylbenzene, ethoxybenzene, fluorobenzene, octylbenzene, propoxybenzene, chloronaphthalene, bromonaphthalene, sulfonaphthalene, butoxynaphthalene, sec-butylnaphthalene, carbethoxynaphthalene, cyanonaphthalene, ethoxynaphthalene, etc.

The preferred starting material, because it represents a convenient and inexpensive source of aromatics, comprises those materials of aromatic character obtained in the manufacture and refining of neutral oils and bright stocks during treatment with a selective solvent designed to extract the predominantly aromatic materials from the paraffinic materials. Solvent extracts resulting from the treatment of mineral lubricating oils for the purpose of separating non-aromatic hydrocarbons (the raffinate and finished oil) from the aromatic hydrocarbons (the extract and waste product) may be used and are preferred as starting materials.

Since the general process of refining mineral lubricating oils in which solvent extracts are obtained is well-known, it is only necessary for present purposes to describe a typical procedure for obtaining same and give some examples by way of illustration.

In a typical operation, desalted crude oil is first charged to a distillation unit where straight-run gasoline, two grades of naphtha, kerosene, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. The residuum is charged to a propane-deasphalting unit wherein propane dissolves the desirable lubricating oil constituents and leaves the asphaltic materials. A typical vacuum residuum charge to the propane-deasphalting unit may have an API gravity of 12.9°, viscosity SUS at 210° F. of 1249, flash 585° F., fire 650° F., C.R. of 13.9 weight percent, and may be black in color. The deasphalted oil may have an API gravity of 21.5° to 21.8°, viscosity SUS at 210° F. of 165–175, NPA color 6–7, flash 575° F., fire 640° F., and C.R. of 1.7–2.0. The deasphalted oil and various lubricating oil distillates from the reduced crude are subjected to solvent extraction for the separation of non-aromatic from aromatic constituents prior to use. The refined oil or "raffinate" from the extraction processes is used per se; extract, predominating in complex aromatic constituents, is distinctively useful in accordance with this invention.

For example, a crude oil from an East Texas field with an API gravity of 33.1 was topped to remove such light fractions as gasoline, naphtha, kerosine, and a light lubricating distillate. A second lubricating distillate cut was then obtained which had a viscosity of 240 SUS at 100° F., 1.0% sulfur, and an API gravity of 24.5. This oil was treated with phenol to produce a raffinate from which a high-quality lubricating oil could be prepared. The oil extracted by phenol treatment, after removal of phenol, is ready for use as the starting material in accordance with this invention.

Solvents other than phenol may be used to obtain the extraction product used in accordance with this invention, for example, liquid sulfur dioxide, nitrobenzene, Chlorex, chlorophenol, trichloroethylene, cresylic acid, pyridine, furfural, or the Duo-Sol solution (comprising liquid propane and cresol) may be used. When using phenol, it is possible to vary the characteristics of the extract and raffinate products considerably by adjustment of the amount of water present. A raffinate of relatively low viscosity index can be obtained by using a water solution of phenol during the extraction, and a raffinate of high viscosity index can be obtained by using anhydrous phenol. Following are the physical characteristics of typical extract products, from lubricating oil stocks derived from various crude oils and other source hydrocarbon materials, which may be used in accordance with this invention.

*Table I*

SOURCES AND PHYSICAL CHARACTERISTICS OF SOLVENT EXTRACTS AND OTHER SOURCE HYDROCARBONS

| Ext. No. | Crude source | Solvent | API grav. | Vis./210° F. | V.I. | Pour | ° F. flash | ° F. fire | Percent C.R. | Percent sulfur | Average molecular wt. |
|---|---|---|---|---|---|---|---|---|---|---|---|
| 1 | East Texas | Phenol | 11.1 | 282 | −40 | +55 | | | 7.2 | 2.66 | |
| 2 | do | do | 15.4 | 285 | +39 | | | | | | |
| 3 | do | do | 12.6 | 310.1 | −1 | +80 | | | 4.7 | 2.27 | |
| 4 | do | do | 14.6 | 313 | +27 | +90 | | | 4.7 | 2.2 | |
| 5 | do | do | 15.4 | 372 | +5 | +60 | | | 4.13 | 2.33 | |
| 6 | do | do | 13.7 | 355 | +27 | +80 | | | | 2.18 | |
| 7 | do | do | 8.6 | 616 | 0 | +70 | | | | | |
| 8 | do | do | 10.5 | 172.1 | −101 | +60 | | | | | |
| 9 | Santa Fe Springs | do | 10.2 | 371 | | +65 | 520 | 600 | | 2.88 | |
| 10 | Texas | Furfural | 13.0 | 1,500 | | +85 | 470 | 515 | | | |
| 11 | Pennsylvania | Chlorex | 12.2 | 1,365 | | +85 | 560 | 630 | | | |
| 12 | do | Nitrobenzene | 10.0 | 1,500 | | +75 | 555 | 640 | | | |
| 13 | Mid-Continent | Propane-cresol | 14.4 | 1,500 | | +100 | 540 | 605 | | | |
| 14 | do | Phenol | 13.6 | 41.7 | −82 | +20 | | | | | |
| 15 | do | Chlorex | 13.6 | 200 | −61 | +75 | | | | | |
| 16 | do | Phenol | 8.9 | 569 | | +75 | | | | | |
| 17 | do | Furfural | 14.9 | 50.2 | 25 | +20 | | | | | |
| 18 | East Texas | Phenol | 13.5 | 341 | 17 | +65 | 530 | 610 | 5.76 | 2.36 | |
| 19 | do | do | 11.1 | 61.5 | −56 | +40 | 435 | 475 | 0.42 | 2.7 | 340 |
| 20 | do | do | 13.7 | 360 | +25 | +65 | 550 | 630 | 5.5 | 2.3 | 590 |
| 21 | do | do | 7.7 | 71.1 | −128 | +35 | 420 | 495 | 0.86 | 3.2 | 340 |
| 22 | do | do | 7.3 | 796 | −76 | +65 | 520 | 610 | 7.7 | 3.0 | |

The solvent extracts from lubricating oils used as starting materials for this invention have the following general properties and characteristics.

*Table II*

| Characteristic: | Range of value |
|---|---|
| Gravity, ° API | 7.3–18.3. |
| Gravity, sp., 60/60° F. | 0.9446–1.0195. |
| Viscosity SUS at 210° F. | 40–1,500. |
| Viscosity index | −153 to +39. |
| Pour point, ° F. | 20–115. |
| Color, NPA | +2–5D. |
| Molecular weight, average | Above 300. |
| Sulfur, percent weight | Above 0.6. |
| Nitrogen, percent weight | Below 1. |
| Aromatic compounds, percent including heterocyclics) | 75–98. |
| Avg. number of rings/mean arom. mol | 1.7–3.5. |

The specific gravities of the extracts in general increase with increase in the viscosity of the raffinate at a constant viscosity index. Stated otherwise, the specific gravities of these extracts increase with decrease in viscosity index of the raffinate at a constant viscosity. For the production of 100±5 V.I. neutral oils, the viscosities of the extracts increase with increase in stated viscosities of the neutral oils (raffinates). The pour points of extracts are high and are affected by changes in the depth of extraction. The sulfur contents are also affected by the depth of extraction. The solvent extracts are characterized by containing aromatic and heterocyclic compounds in the range of 75–98%, the remainder being principally saturates, or material behaving as saturates, together with a minor proportion of up to 7% of organic acids. The organic acids present are not susceptible to extraction by the use of aqueous strong caustic because of the solubility of the sodium salts of the acids in the oil. Little or no asphaltic material is present in solvent extracts and they contain no materials volatile at room temperature.

The data shown in Tables I and II are merely illustrative and the invention is not to be limited thereby.

It is apparent that the characteristics of the final halomethylated product will vary, depending on the concentration and types of aromatic starting materials employed. In such complicated mixtures as solvent extracts from lubricating oil fractions, the content of reactable materials may vary from about 30% to 100% by weight of the aromatic and heterocyclic material present.

In carrying out the process of this invention, either formaldehyde or paraformaldehyde may be used. Any formaldehyde polymer yielding substantially anhydrous formaldehyde under the conditions of the process may be employed in this process. Ordinarily, the stoichiometric amount (based on the chlorine content of the product), or slightly more than the stoichiometric amount, of formaldehyde (or formaldehyde polymer) is used in our process. Aqueous solutions of formaldehyde, such as formalin, cannot be used in the present process. If desired, the formaldehyde (or paraformaldehyde) may be added to the phosphorus oxychloride, and the mixture used in chloromethylation of the aromatic compound or mixture of aromatic substances.

The preferred reaction temperature is approximately 40–60° C., although the process may be carried out at temperatures from 20–105° C., or even higher. The use of higher temperatures may favor condensation of the aromatic material to higher-molecular-weight substances at the expense of chloromethylated products.

For this chloromethylation process, sufficient phosphorus oxychloride is used to furnish the halogen in the chloromethylated product. Stoichiometrically, one mol of phosphorus oxychloride is required for each three mols of formaldehyde, which then react with the aromatic to form the chloromethylated product. In practice, somewhat more phosphorus oxychloride may be advantageous, but too great an excess of phosphorus oxychloride may cause an excessive amount of condensation, producing a high-molecular-weight, chloromethylated product.

Phosphorus trichloride and phosphorus pentachloride are not effective replacements for phosphorus oxychloride in this process. However, phosphorus oxybromide or phosphorus oxyiodide may be used to prepare bromomethylated or iodomethylated products instead of chloromethylated products.

A solvent composed of one or more paraffinic or cycloparaffinic hydrocarbons not susceptible to chloromethylation may be used to dissolve the aromatic reactant prior to chloromethylation by this process. The solvent used must boil below the initial boiling point of the aromatic reactant so that it can be removed from the chloromethylated product by distillation.

This process may be carried out either batchwise or continuously. Whatever process is used, provision must be made for controlling temperature since the reaction is exothermic. It is carried out best at approximately 40–60° C. Under such conditions the reactants should be maintained in contact with one another until the exothermic reaction has subsided. This period may be as long as three hours or even longer. Further heating for several hours is conducive to maximum yields.

In order to demonstrate the invention, the following examples are given.

EXAMPLE I

A three-neck, 500-cc. glass flask was fitted with a mechanical stirrer, thermometer, and reflux condenser, and was immersed in a water bath containing water at room temperature. After 165 gms. (0.49 mol) of solvent extract, No. 19 of Table I, and 18.8 gms. (0.63 mol) of paraformaldehyde had been added to the flask and stirred mechanically, 30.7 gms. (0.2 mol) of phosphorus oxychloride were added in small portions during 10 to 15 minutes, while the stirring was continued. After addition of the phosphorus oxychloride was completed, the water in the bath was heated slowly. When the temperature of the reaction mixture reached approximately 40° C. rapid reaction took place, with foaming, and heating of the water was discontinued. Reaction proceeded during the next three hours, at the end of which time the temperature had reached approximately 77° C. Stirring of the reaction mixture was continued about three hours longer, heating the water bath whenever necessary to maintain the temperature of the mixture in the flask between 53° C. and 79° C. The reaction mixture was diluted with approximately 200 ml. of benzene, filtered to remove a small amount of tarry material, and then washed with water until the water washings were free of chloride ion and no longer gave a test for free mineral acid with methyl orange indicator. The benzene was removed by distillation, leaving a greenish-black chloromethylated product containing 4.5% chlorine by analysis. This chlorine was reactive toward silver nitrate and represented approximately 50% chloromethylation of the extract.

EXAMPLE II

Solvent extract No. 19 was chloromethylated as in Example I, except that a stream of hydrogen chloride was constantly passed through the reaction mixture during the run. The product contained 4.3% chlorine by analysis. This result shows that the use of hydrogen chloride did not result in a better yield of chloromethylation product.

EXAMPLE III

Solvent extract No. 19 was treated as in Example I, except that the paraformaldehyde was omitted. The product contained only 0.2% chlorine by analysis. This showed that phosphorus oxychloride was essentially inactive as a chlorinating agent for the solvent extract under the stated conditions.

EXAMPLE IV

A run similar to Example I was carried out, using phosphorus trichloride instead of phosphorus oxychloride. The product contained only 0.25% chlorine by analysis, showing that phosphorus trichloride was relatively ineffective, in conjunction with paraformaldehyde, as a chloromethylating agent.

EXAMPLE V

A run was carried out as in Example I, but with phosphorus pentachloride instead of phosphorus oxychloride. The product contained only 1.1% chlorine by analysis, and the chlorine was practically all unreactive to silver nitrate. This indicated that some nuclear chlorination rather than chloromethylation had taken place during the run.

EXAMPLE VI

Benzene (78 gms.), paraformaldehyde (30 gms.), and phosphorus oxychloride (51.1 gms.) were reacted as in Example I. The chloromethylated product contained chlorine which was reactive to silver nitrate, showing that chloromethylation had taken place.

EXAMPLE VII

Naphthalene (51.3 gms.), paraformaldehyde (15 gms.), and phosphorus oxychloride (61 gms.) were reacted as in Example I. The chloromethylated product contained chlorine which was reactive to silver nitrate, showing that chloromethylation had taken place.

The invention has been illustrated by a number of examples using solvent extracts as the source of the complex aromatic hydrocarbons. Such lubricating oil extracts represent a preferred source material for the reaction because not only does the halomethylated product represent a useful intermediate from which further products can be made, but the products also represent the utilization of a material which is ordinarily discarded as a waste product. Solvent extracts are further characterized by their complexity, which gives unique properties to the halomethylated product. The average molecular weight of solvent extracts obtained in the preparation of 200 vis. neutral oils is about 340. These extracts contain about 75% to 87% of complex aromatic hydrocarbons and heterocyclics of aromatic character having an average of about 2.7 carbon rings per aromatic molecule. The polynuclear aromatics from petroleum sources contain a predominance of aromatic substances having two to three carbon rings per aromatic molecule and have an average molecular weight of above 300. The extracts obtained during the manufacture of 150–160 vis. bright stocks contain from 85% to 98% of complex aromatics and heterocyclics having an average of about 3.3 carbon rings per aromatic molecule. When a typical solvent extract was subjected to carbon-type analysis using the method of Kurtz, King, Stout, Partikan and Skrabek (Anal. Chem. 28, 1928 (1956)), the results were: $C_a$ 39%, $C_n$ 30%, and $C_p$ 31%. In this analysis the $C_a$ and $C_n$ include only the carbon atoms in the rings, while $C_p$ includes the carbon atoms present as paraffins and as side chains on the aromatic and naphthene rings. This same extract, No. 19 in Table I, had an average molecular weight of 340, contained 84% aromatics (and heterocyclics of aromatic type), as determined by the silica gel procedure, showed 16% saturated hydrocarbons, etc., 86.4% carbon and 10.7% hydrogen.

The complexity of the types of compounds present, as based on these analyses, is illustrated by the following table:

*Table III*

ESTIMATED CHEMICAL COMPOSITION OF SOLVENT EXTRACTS NOS. 19 AND 21 OF TABLE I

| Type of compound: | Approx. percent in the extract |
|---|---|
| Saturated hydrocarbons | 12.5 |
| Mononuclear aromatics—Substituted benzenes | 25.0 |
| Dinuclear aromatics—Substituted naphthalenes | 30.0 |
| Trinuclear aromatics— | |
|   Substituted phenanthrenes | 10.0 |
|   Substituted anthracenes | 5.0 |
| Tetranuclear aromatics— | |
|   Substituted chrysenes | 0.5 |
|   Substituted benzphenanthrenes | 0.2 |
|   Substituted pyrenes | 0.2 |
| Pentanuclear aromatics—Perylene | 0.01 |
| Sulfur compounds,[1] oxygen compounds, etc. | 16.5 |

[1] Mainly heterocyclic compounds.

Any portion of the reactive aromatic constituents in solvent extracts may be isolated therefrom, or from other sources, to be used as starting materials for the reaction with the formaldehyde-producing agent and the phosphorus oxychloride. For example, solvent extracts may be distilled and selected fractions thereof used as the starting materials. The content of reactive, complex, polynuclear, aromatic compounds and heterocyclics present in solvent extracts, as illustrating the preferred source material, may vary, depending on the type of solvent, the extraction process applied and the mineral oil treated, although the type of compounds present in the extract is not so varied. Extracts containing from about 30% to 90% of reactive polynuclear aromatics and heterocyclics of aromatic nature represent a preferred type of starting material.

The halomethylated complex aromatic materials described herein find utility in lubricating oil compositions wherein they exhibit extreme pressure properties and are also useful as intermediates for the preparation of alcohols and dialcohols. In order to demonstrate the utility of these products as extreme pressure agents, the following further examples and four-ball bench tests are given:

EXAMPLE VIII

Extract No. 19 of Table I was chloromethylated in six batches by adding phosphorus oxychloride dropwise to well-stirred separate mixtures of the extract with paraformaldehyde. The reaction began at a temperature of about 60° C. External cooling was applied intermittently in order to control the foaming which resulted. The reaction product was diluted with 1 to 3 volumes of benzene, filtered to remove tarry substances, and the filtrate washed with water until free of mineral acids. The benzene was finally removed from the chloromethylated product by distillation. Varying amounts of extract, paraformaldehyde, and phosphorus oxychloride were used in some of these runs. The sixth run was carried out in the absence of paraformaldehyde to show that phosphorus oxychloride by itself under these conditions causes only negligible chlorination of the product. In Run No. 4, dry hydrogen chloride gas was passed through the reaction mixture during the entire reaction period in order to determine whether this would increase the extent of chloromethylation of the aromatic extract. The results are shown in Table IV.

*Table IV*

CHLOROMETHYLATION OF EXTRACT NO. 19

| Run | Reactants | | | Maximum reaction temp. (° C.) | Yield (g.) | Reaction product | | |
|---|---|---|---|---|---|---|---|---|
| | Extract No. 19 (g.) | Paraformaldehyde (g.) | Phosphorus oxychloride (g.) | | | Percent chlorine | Percent sulfur | Percent phosphorus |
| 1 | 82.5 | 9.4 | 15.3 | 105 | 366 | 4.5 | 2.2 | Nil |
| 2 | 165.0 | 18.8 | 30.7 | 104 | | | | |
| 3 | 165.0 | 18.8 | 30.7 | 83 | | | | |
| 4 | 165.0 | 18.8 | 30.7 | 82 | | 4.3 | | Nil |
| 5 | 165.0 | 36.8 | 61.3 | 61 | 132 | 7.0 | | Nil |
| 6 | 165.0 | | 30.7 | 97 | | 0.2 | | Nil |

The products from runs 1, 2 and 3 were combined for the determinations of chlorine, sulfur and phosphorus. the chlorine content of the product in run 4 shows that the hydrogen chloride did not increase the degree of chloromethylation of the extract.

Several lubricant blends containing various amounts of a phosphosulfurized sperm oil base, chloromethylated extract, dibenzyl disulfide, a V.I. improver and mineral oil are compared with a known extreme-pressure additive of the chlorinated-wax type in Table V.

Table V
E.P. PROPERTIES OF LUBRICANT BLENDS CONTAINING CHLOROMETHYLATED EXTRACT

| Lubricant blend | A | B | C | D | E |
|---|---|---|---|---|---|
| Composition of lubricant blend: | | | | | |
| Phosphosulfurized sperm oil base (g.) | 10.0 | 10.0 | 10.0 | | 10.02 |
| Chloromethylated extract (g.) (combined runs 1-3 of Table IV) | 1.0 | 2.5 | 5.0 | | |
| Dibenzyl disulfide (g.) | | | | | 0.98 |
| Chlorinated-wax-type additive (g.) | | | | 9.5 | |
| V.I. improver (acryloid 150) (g.) | 0.5 | 0.5 | 0.5 | | |
| Mineral oil (g.) | 88.5 | 87.0 | 84.5 | 90.5 | 89.0 |
| Four-ball tests: | | | | | |
| Weld point (kg.): | | | | | |
| Uncoated | 300/310 | 340/350 | 430/440 | 350 | 310/320 |
| Coated | 630/640 | 630/640 | 670/680 | 630 | 610/620 |
| Wear diameter (20 kg./5 min.) (mm.): | | | | | |
| Uncoated | 0.305 | 0.323 | 0.308 | 0.272 | 0.283 |
| Coated | 0.650 | 0.602 | 0.632 | 0.627 | 0.777 |

As is apparent from the foregoing description, the invention relates to a process of preparing halomethylated derivatives selected from the group of bromo-, iodo-, and chloromethylated derivatives of organic compounds containing at least one replaceable hydrogen atom by reaction of such organic compounds with the corresponding phosphorus oxyhalide and a formaldehyde-producing agent. The organic compound may be derived from a wide source varying from simple cyclic compounds like benzene, carbocyclic compounds, aromatic compounds of simple or complex nature, substituted aromatic and heterocyclic compounds having a wide variety of substituent groups to complex polynuclear aromatic hydrocarbons derived from petroleum, e.g., solvent extracts or complex polynuclear aromatic hydrocarbons and heterocyclic compounds containing a predominance of hydrocarbon rings having two or three carbon rings per aromatic molecule or heterocyclic nuclei containing carbon atoms and up to three atoms of sulfur or nitrogen or both per molecule. Also, the starting materials may have a wide variety of substituent groups (Z) attached to the nucleus, such as halogens, nitro, sulfo, amino, carboxyl and other groups herein defined. In addition, the invention encompasses the compounds made by the process of using the combination reactants phosphorus oxychloride, phosphorus oxyiodide, and phosphorus oxybromide with formaldehyde, or formaldehyde polymers. Mixtures of chloromethylated, iodomethylated and bromomethylated compounds may be prepared using this invention, either by employing mixed reactants or mixing the finished reaction products. Lubricating oil compositions containing the reaction products of the instant process are also contemplated. The only limitations applying to the invention appear in the appended claims.

The embodiments of the invention in which an exclusive property or privilege is claimed are defined as follows:

1. The process of preparing halomethylated organic compounds of the group consisting of bromo-, iodo-, and chloromethylated derivatives of organic compounds of cyclic structure having at least one unsubstituted nuclear carbon atom which comprises reacting said organic compound at a temperature of about 20° to 105° C. with about one mol of the corresponding phosphorus oxyhalide and about 3 mols of an aldehyde of the group consisting of formaldehyde and paraformaldehyde per unsubstituted nuclear carbon atom.

2. The process in accordance with claim 1 in which said organic compounds are of the group consisting of aromatic hydrocarbons containing 6 to 20 carbon atoms, heterocyclic compounds of sulfur containing 4 to 12 carbon atoms, heterocyclic compounds of nitrogen containing 4 to 13 carbon atoms, haloaromatic compounds containing 6 to 10 carbon atoms, alkoxy aromatic hydrocarbons containing 6 to 10 carbon atoms in the aromatic portion thereof, sulfonaphthalene, cyanonaphthalene, carbethoxynaphthalene, and complex, high-molecular-weight polynuclear aromatic and heterocyclic compounds present in solvent extracts obtained in the solvent extraction of mineral lubricating oils.

3. The process in accordance with claim 1 in which said halomethylated organic compounds are chloromethylated derivatives.

4. The process in accordance with claim 1 in which said aldehyde is paraformaldehyde.

5. The process of preparing halomethylated organic compounds selected from the group consisting of bromo-, iodo-, and chloromethylated derivatives of the complex high-molecular-weight, polynuclear, aromatic hydrocarbons and heterocyclic compounds, containing an average number of about 1.7 to 3.5 rings per mean aromatic molecule and having an average molecular weight above 300 which comprises reacting said complex organic compound with about 1 mole of the corresponding phosphorus oxyhalide and about 3 mols of an aldehyde selected from the groups consisting of formaldehyde and paraformaldehyde per unsubstituted nuclear carbon atom in said complex organic compound.

6. The process in accordance with claim 5 in which said halomethylated complex organic compound is a chloromethylated derivative.

7. The process in accordance with claim 5 in which said aldehyde is paraformaldehyde.

8. The process comprising reacting about 0.49 mol of solvent extract obtained in the solvent extraction of mineral lubricating oils with about 0.63 mol paraformaldehyde and about 0.2 mol of phosphorus oxychloride at a temperature of about 20–79° C. and recovering the chloromethylated derivative of the complex high-molecular-weight, polynuclear aromatic and heterocyclic nuclei present in said solvent extract.

References Cited in the file of this patent
UNITED STATES PATENTS

| | | |
|---|---|---|
| 1,425,393 | Laska et al. | Aug. 8, 1922 |
| 2,250,384 | Lincoln et al. | July 22, 1941 |
| 2,342,433 | Smith et al. | Feb. 22, 1944 |
| 2,407,087 | Lieber et al. | Sept. 3, 1946 |

OTHER REFERENCES

Adams et al.: Organic Reactions, pub. by John Wiley & Sons, New York, N.Y., vol. I, 1954, pp. 63–90.

Van Wazer: Phosphorus and Its Compounds, Interscience Pub. Co. (1958), vol. 1, page 245.